UNITED STATES PATENT OFFICE.

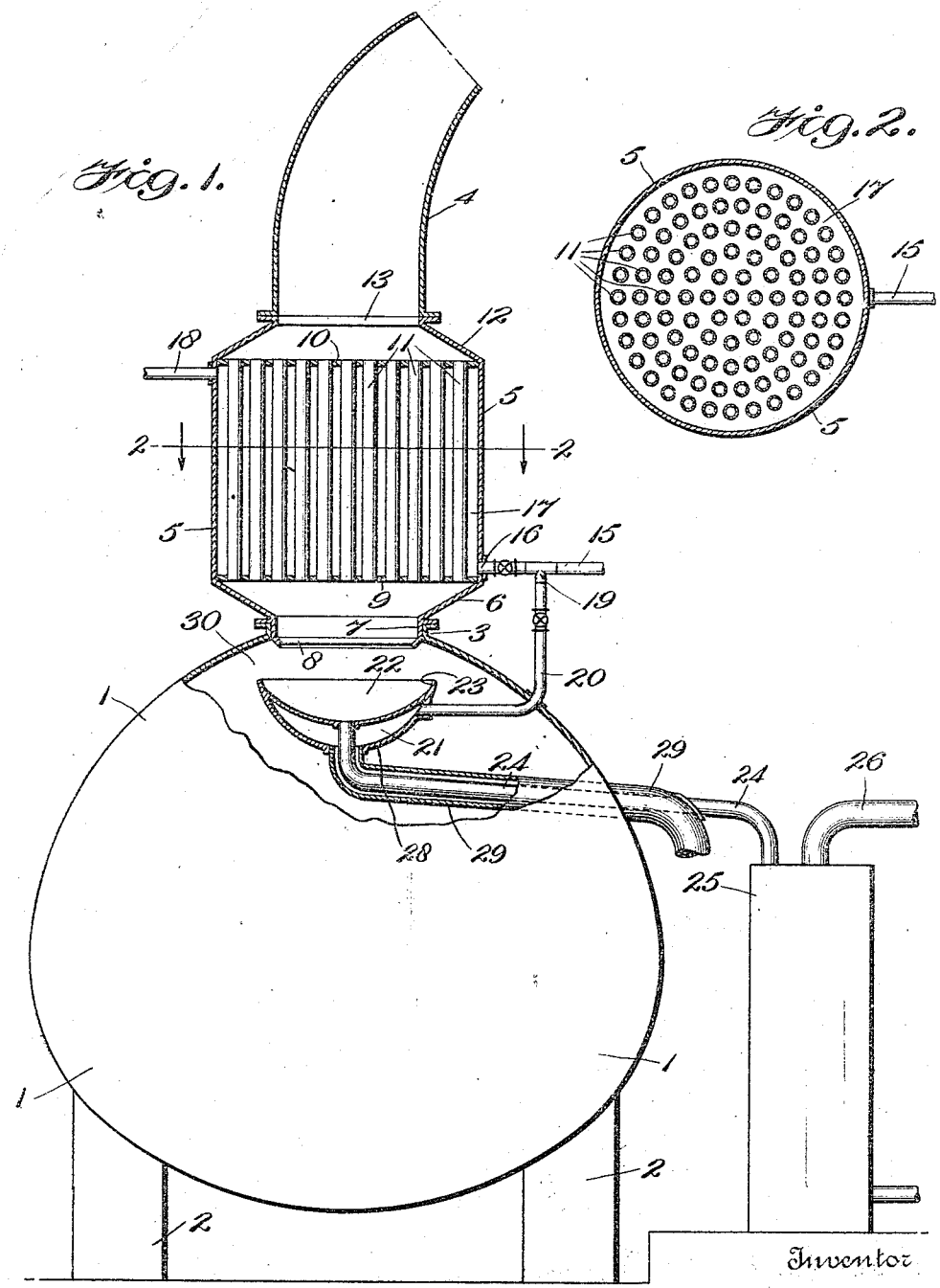

ALEXANDER L. STRAUS, OF BALTIMORE, MARYLAND, ASSIGNOR TO BALTIMORE PROCESS COMPANY, OF BALTIMORE, MARYLAND, A CORPORATION OF DELAWARE.

DISTILLING APPARATUS.

1,267,709.   Specification of Letters Patent.   Patented May 28, 1918.

Application filed August 31, 1917. Serial No. 189,125.

*To all whom it may concern:*

Be it known that I, ALEXANDER L. STRAUS, a citizen of the United States, residing at Baltimore, in the State of Maryland, have invented certain new and useful Improvements in Distilling Apparatus; and I do hereby declare the following to be a full, clear, and exact description of the invention, such as will enable others skilled in the art to which it appertains to make and use the same.

This invention relates to a distilling apparatus especially adapted for removing alcohol from beer and has for its object to provide a device of this nature which will be simple in construction, comparatively inexpensive to manufacture and which will be more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is an elevational view partly in section of an apparatus made in accordance with this invention; and Fig. 2 is a cross sectional view taken on the line 2—2 of Fig. 1, looking in the direction of the arrows, with certain parts omitted.

1 indicates any suitable distilling vessel but preferably a brewer's kettle of any suitable form or construction, 2 any suitable supports therefor, 3 the usual opening with which said kettles are provided, 4 the usual curved spout, pipe or other means open to the atmosphere adapted to receive the vapors from the kettle 1, and 5 a condenser located between the spout 4 and the opening 3 of the kettle.

Said condenser is preferably provided with the depending tapered bottom portion 6 having the neck portion 7 fitting the opening 3 and said neck portion 7 is preferably provided with the inwardly extending lip portion 8 as shown. Said condenser is further made up of the bottom plate 9, top plate 10 and the open ended tubes 11 as will be clear from the drawings. The upper portion 12 of said condenser 5 is also preferably tapered inwardly as shown, and provided with the opening 13 to which may be readily detachably fitted the curved member 4 in any suitable manner.

15 represents a water supply entering said condenser as at 16, and filling the space 17 thereof with water. 18 represents an outlet for the condenser 5 and suitably joined as at 19 to the supply 15 is a pipe 20 leading water into the space 21 of the pan or receptacle 22 preferably provided with the upwardly extending lip 23 and the outlet pipe 24 leading to the alcohol still 25 having the outlet 26 as shown. The pan 22 is provided with the jacketing member 28 to form the space 21, and from said space 21 leads the outlet pipe 29 as shown. The upper member 23 of said pan is spaced apart from the interior walls of the still 1 as illustrated, leaving the passages 30 for the vapor to reach the condenser.

As above stated, this apparatus is especially adapted for the removal of alcohol in beer and in use the beer is contained in the vessel or kettle 1 whereupon heat is applied in any suitable manner not shown and is so regulated as to be just sufficient to drive off substantially all the alcohol in the beer. The vapor thus driven off will contain not only the alcohol but also some other constituents of the beer and considerable water. The temperature of the water admitted into the space 17 of the condenser is so adjusted that substantially all the alcohol vapors will be condensed before they pass entirely through the tubes 11, and of course, considerable water will be condensed with said alcohol. Any alcohol which may pass entirely through the tubes 11 and reach the member 4 will be condensed in said member 4 and fall back by gravity on to the plate 10 and find its way back through the tubes 11. Any other uncondensed vapors will pass out the top 4 into the atmosphere. A part of the condensed alcohol containing more or less water will drip down along the inclined portion 6 on to the lip 8 of the neck 7, and from said lip 8 will drip or fall into the pan 22. Other portions of the alcohol will drip directly from the tubes 11 into the pan 22, and said pan being maintained at the proper temperature by water passing from the pipe 20 into the space 21 and out through the pipe 29, the alcohol and water thus caught in the pan 22 will not be redistilled, but it will flow along the pipe 24 into the small alcohol still 25 which may be of any suitable construction, where it will be separated from the water present in any usual or convenient manner. After the beer has been thus deprived of its alcohol it may be drawn off or removed from the kettle 1, in the usual way, and further treated for the production of a non-alcoholic beverage in the manner disclosed in my Patent #1223121, dated Apr. 17, 1917, or it may be otherwise disposed of.

It will thus be seen that by making the condenser 5 readily detachable from the kettle 1, and also readily detachable from the member 4, I am enabled to utilize the ordinary brewers' kettles that are now in use in breweries for the purpose of producing non-alcoholic beer, for all that it is necessary to do is to equip such kettles with cooling pans such as 22 and with a condenser such as 5.

These condensers being of the simple construction shown are readily assembled and fitted into the mouth 3 of a kettle 1 while the member 4 is readily detachably fitted in any suitable manner to the mouth 13 of the condenser 5 as will be clear from the drawings.

It is obvious that those skilled in the art may vary the details of the construction as well as the arrangements of parts without departing from the spirit of the invention, and therefore, I do not wish to be limited to the above disclosure except as may be required by the claims.

What I claim is:—

1. In an apparatus for separating alcohol from beer the combination of a vessel in which the beer may be heated; a condenser to which the vapors from said beer may pass located above said vessel; and a collecting vessel located below said condenser and inside said first named vessel adapted to receive the condensed vapors from said condenser, substantially as described.

2. In a liquid distilling apparatus the combination of a vessel in which the liquid may be heated; a condenser provided with open ended tubes to which the vapors from said liquid may pass located above said vessel, a member connecting one end of said tubes with the atmosphere; a collecting vessel adapted to receive the condensed vapors located in said first named vessel and below the other end of said tubes; and means to cool said last named vessel, substantially as described.

3. In an apparatus for distilling liquids the combination of a vessel in which the liquid may be heated; a collecting vessel for the condensed vapors located inside said first named vessel; means to maintain the temperature of said collecting vessel below that of said first named vessel; a condenser provided with substantially vertically disposed open ended tubes located above said collecting vessel; and a tapered connection open to the atmosphere located above and joined to said condenser, substantially as described.

4. In an apparatus for distilling liquids the combination of a vessel in which the liquid may be heated; a collecting vessel for the condensed vapors located inside said first named vessel; means to maintain the temperature of said collecting vessel below that of said first named vessel; a condenser provided with substantially vertically disposed open ended tubes located above said collecting vessel; a tapered connection open to the atmosphere located above and joined to said condenser; means for separating alcohol from water; and a connection between said collecting vessel and said last mentioned means; substantially as described.

5. In an apparatus for separating alcohol from beer the combination of a brewer's kettle in which the beer may be heated; a collecting pan located inside said kettle near the mouth thereof; a condenser provided with a plurality of substantially vertically disposed open ended tubes detachably attached to said kettle above said pan; means for separating water from alcohol; a connection leading from said pan to said means; and means to maintain said pan at a temperature below the interior of said kettle, substantially as described.

6. In an apparatus for separating alcohol from beer; the combination of a brewer's kettle in which the beer may be heated; a collecting pan provided with a water cooling means located inside said kettle near the mouth thereof; a condenser having a neck terminating in a lip and provided with a plurality of substantially vertically disposed open ended tubes detachably attached to said kettle above said pan; a spout open to the atmosphere joined to said condenser; means for separating water from alcohol; a connection leading from said pan to said means; and means to maintain said pan at a temperature below that of the interior of said kettle, substantially as described.

In testimony whereof I affix my signature.

ALEXANDER L. STRAUS.